(12) United States Patent
Allberg (10) Patent No.: US 7,825,372 B2
(45) Date of Patent: Nov. 2, 2010

(54) SIMULATED DOSE CALIBRATOR SOURCE STANDARD FOR POSITRON EMISSION TOMOGRAPHY RADIONUCLIDES

(75) Inventor: Keith C. Allberg, Weare, NH (US)

(73) Assignee: RadQual, LLC, Weare, NH (US)

( * ) Notice: Subject to any disclaimer, the term of this patent is extended or adjusted under 35 U.S.C. 154(b) by 96 days.

(21) Appl. No.: 12/400,062

(22) Filed: Mar. 9, 2009

(65) Prior Publication Data

US 2009/0194677 A1     Aug. 6, 2009

Related U.S. Application Data

(63) Continuation-in-part of application No. 11/485,872, filed on Jul. 13, 2006, now Pat. No. 7,615,740.

(60) Provisional application No. 60/791,161, filed on Apr. 11, 2006.

(51) Int. Cl.
    *G01D 18/00*   (2006.01)
(52) U.S. Cl. .................................................. 250/252.1
(58) Field of Classification Search ............... 250/252.1, 250/363.01, 363.02, 363.04
    See application file for complete search history.

(56) References Cited

U.S. PATENT DOCUMENTS 4,333,010 A     6/1982   Miller (Continued)

FOREIGN PATENT DOCUMENTS

EP     1416297     6/2004

OTHER PUBLICATIONS

U.S. Appl. No. 60/791,161, filed Apr. 11, 2006, Allberg.

(Continued)

*Primary Examiner*—David P Porta
*Assistant Examiner*—Marcus H Taningco
(74) *Attorney, Agent, or Firm*—Fay Sharpe LLP (57) ABSTRACT

A method for calibration and a calibrator source standard calibrated by the method are provided. The calibration method includes providing mock syringes, or other simulated dose container. A first of the mock syringes is filled with a short half life positron emitter. A second of the mock syringes is filled with a longer half life radionuclide set in a matrix material such as an epoxy. The activities of the two syringes can be determined, ideally in the same ion chamber, for example, against a radioactive source standard having a half life greater than the first and second radionuclides. This allows a conversion factor to be determined which can be used for a calibrator source standard formed as for the second mock syringe (i.e., with the same type of container containing the longer half life radionuclide set in a matrix material), when the calibrator source standard is used as a proxy for calibrating a calibrator for use in determining the activity of a dose container of the same configuration containing a dose of the short lived radionuclide.

28 Claims, 5 Drawing Sheets

U.S. PATENT DOCUMENTS

| | | | |
|---|---|---|---|
| 4,401,108 A | | 8/1983 | Galkin et al. |
| 4,430,258 A | * | 2/1984 | McFarland et al. .......... 252/644 |
| 4,506,155 A | | 3/1985 | Suzuki et al. |
| 4,771,177 A | * | 9/1988 | Brown ................... 250/363.09 |
| 6,251,059 B1 | | 6/2001 | Apple et al. |
| 2002/0156338 A1 | | 10/2002 | Menuhr |
| 2004/0260143 A1 | | 12/2004 | Reilly et al. |
| 2005/0029465 A1 | | 2/2005 | Lemer |
| 2005/0047114 A1 | | 3/2005 | Harrell et al. |
| 2005/0107698 A1 | | 5/2005 | Powers et al. |

OTHER PUBLICATIONS

*Atomlab 100 Plus Dose Calibrator*, http://www.biodex.com/radio/dosecal/dose_265feat.htm., downloaded Jun. 21, 2006, copyright 2003.

Auriga Medical—*The New Name in Nuclear Medicine*, http://www.aurigamedical.com/auto/calibration.asp., downloaded Jun. 20, 2006.

Cessna, et al., *A Comparison of the CIEMAT/NIST Efficiency Tracing Method and the Triple-to-Double-Coincidence Ratio Method in the Measurement of Germanium-68, LSC*, May 2008.

*New Dose Calibrator Standard for Fluorine-18 F-18, Biotech Business Week*, Oct. 6, 2008, http://goliath.ecnext.com/coms2/., downloaded Feb. 24, 2009.

*NIST Tech Beat*, Jan. 8, 2008, http://www.nist.gov/public_affairs/techbeat/tb1002_0108.htm., downloaded Feb. 24, 2009.

O'Farrell, et al., *Accuracy of the F-18 Calibration Setting with a Capintec Dose Calibrator, J. Nucl. Med.*, 29(Supplement 1):435P (2008).

* cited by examiner

SIMULATED DOSE CALIBRATOR SOURCE STANDARD FOR POSITRON EMISSION TOMOGRAPHY RADIONUCLIDES

This application claims the priority of U.S. Provisional Application Ser. No. 60/791,161, filed Apr. 11, 2006, entitled DOSE CALIBRATOR SYRINGE DESIGN, and U.S. application Ser. No. 11/485,872, filed Jul. 13, 2006, entitled SYRINGE-SHAPED DOSE CALIBRATOR SOURCE STANDARD, by Keith C. Allberg, the disclosures of which are incorporated herein in their entireties, by reference.

BACKGROUND

The present exemplary embodiment relates to radiopharmaceuticals. It finds particular application in conjunction with a dose calibrator or radioisotope calibrator for positron isotopes, and will be described with particular reference thereto.

A dose calibrator (radioisotope calibrator) is a device used in nuclear medicine that measures the total energy of a specific radionuclide in units of Curies (Ci), millicuries (mCi), or microcuries ($\mu$Ci). It includes a hollow, lead-shielded cylinder, into which radionuclides are lowered for measurement. Such devices can be programmed for specific radioisotopes, or adjusted for isotopes not preprogrammed. A dose calibrator is commonly used to obtain measurements of the total radioactivity of isotopes during or after manufacturing and prior to administration to patients undergoing nuclear medicine diagnostic imaging procedures or radioisotope therapy procedures. Regulatory authorities specify when a radioisotope dose calibrator will be used and the timing of required quality control checks (constancy, accuracy, linearity, and geometrical dependence).

Currently, a dose calibrator source standard is used for calibration of the dose calibrator. The calibration source includes a cylindrical vial comprising a predetermined amount of the radionuclide to be calibrated, together with a decay calendar, which allows a user to determine the amount of radionuclide present in the source at the time of testing. The current dose calibrator source standards are designed to closely approximate the geometry of manufacturing containers and unit dose radiopharmaceuticals dispensed by radiopharmacies and to meet the standards implied in CEI-IEC 61145 "Calibration and Usage of Ionization Chamber Systems for Assay of Radionuclides;" CEI-IEC 1303 "Medical Electrical Equipment—Radionuclide Calibrators—Particular Method of Describing Performance;" ANSI N42.13-1986 "Calibration and Usage of 'Dose Calibrator' Ionization Chambers for the Assay of Radionuclides;" and, 10 CFR 35.50 "Possession, Use, Calibration, and Check of Dose Calibrators."

The current Dose Calibrator Source Standards are designed to approximate the geometry of a typical radiopharmaceutical multidose vial or radionuclide generator elution vial (10 milliliters volume to 30 milliliters volume, respectively) used for gamma emitting nuclides. However, Positron Emission Tomography (PET) devices employ positron-emitting radionuclides, such as Fluorine 18. The positrons collide with a subject under investigation, resulting in the emission of pairs of gamma rays, which are detected. PET imaging systems are widely used to diagnose cancer recurrences, metastases of cancer, whether an early stage of cancer is present or not, and, if cancer has spread, its response to treatment. PET is also used in diagnosing certain cardiovascular and neurological diseases by highlighting areas with increased, diminished, or no metabolic activity. This has lead to a demand for manufacturing and dispensing of PET radionuclides and radiopharmaceuticals in a vial or a syringe for unit dosing. For accurate measurements, dose calibrator source standards that approximate radioactivity volume, physical geometry, and radionuclide photon emission of the unit doses are desired. However, common positron emitting radionuclides are short lived and are not amenable to being incorporated into dose calibrator source standards. Accordingly, even though the PET device may incorporate highly accurate gamma detectors, it is often the case that changes in cancers over time are not observed because of lack of accurate calibration of the dose applied to the patient or tissue sample. The current methods for calibrating PET emitters are based on theoretical calculations which have now been found to provide errors of about 20%.

There remains a need for a calibrator source standard and calibration method for simulation of PET radionuclides which can be used for calibration of a dose calibrator which can then be used to check the unit dose.

BRIEF DESCRIPTION

In accordance with one aspect of the exemplary embodiment, a method of calibrating a dose calibrator includes providing a first container which simulates the shape of a dose container for a first radionuclide, the first container containing the first radionuclide, and providing a second container which also simulates the shape of the dose container. A radioactive source-containing material is sealed within the container. The radioactive source-containing material includes a second radionuclide dispersed within a matrix material. The second radionuclide has a half life which is greater than that of the first radionuclide. The first and second containers are calibrated against a radioactive source standard having a half life greater than the first and second radionuclides, whereby the second container is calibrated to provide a conversion factor for the first radionuclide as a function of the second radionuclide activity, such that a calibrator source standard configured as for the second container is able to be used to accurately calibrate an activity calibrator for determining an activity of the dose container of the first radionuclide.

In accordance with another aspect of the exemplary embodiment, a dose calibrator source standard is provided. The standard includes a container which simulates the shape of a dose container which contains a first radionuclide which is a positron emitter. A radioactive source-containing material is sealed within the container. The radioactive source-containing material includes a second radionuclide dispersed within a matrix material and having a half life which is greater than the positron emitter. The dose calibrator source standard has been calibrated to provide a conversion factor for the first radionuclide.

DETAILED DESCRIPTION

Aspects of the exemplary embodiment relate to a dose calibrator source standard which is designed to closely approximate the geometry of unit dose or multiple dose radiopharmaceuticals dispensed in syringe and/or vial form which meets the above-mentioned CEI-IEC, ANSI, and CFR standards. The dose calibrator source standard includes a positron-emitting master radionuclide which has a half life of sufficient time to be reasonable for daily use. Positrons have emission at 511 kev. For example, the half life of the master radionuclide may be greater than 20 days and in one embodiment, greater than 100 days. The dose calibrator source standard has been calibrated against a short-lived source. In one embodiment Germanium 68 (Ge-68) (half life about 271 days) or Sodium 22 (Na-22) (half life about 2.6 years) is used as the master nuclide which is used in the dose calibrator source standard to simulate short-lived nuclides, in particular, positron-emitting PET radionuclides. Short-lived PET nuclides include positron emitters having a half life which is typically less than 5 days, and generally less than one day, such as Fluorine (F-18) (half life 110 minutes), Carbon 11 (C-11) (half life 20 minutes), Nitrogen 13 (N-13) (half life 10 minutes), Oxygen-15 (O-15) (half life 2 minutes), Iodine 124 (I-124) (half life 4.2 days), Rubidium 82 (Rb-82) (half life 75 seconds), Copper 64 (Cu-64) (half life about 0.5 days), and combinations thereof, in quantities that are appropriate or required for dosing. Accordingly, the positron-emitting master nuclide may have a half life which is at least 50 times, and in one embodiment, at least 100 times that of the short-lived radionuclide.

The dose calibrator source standard includes a label which indicates its activity in terms of the master nuclide and a conversion factor or corresponding activity for the PET nuclide for which it acts as a proxy, such as an activity/conversion factor for one or more of Fluorine (F-18), Carbon 11 (C-11), Nitrogen 13 (N-13), Oxygen-15 (O-15), Iodine 124 (I-124), Rubidium 82 (Rb-82), Copper 64 (Cu-64). For example, the standard may be labeled as Ge-68 1.5 millicuries and a multiplication factor provided for each of the PET nuclide for which it acts as a proxy, such as 0.95 for F-18. To arrive at the equivalent PET nuclide activity, the user performs the multiplication: 1.5×0.95=1.425. Exemplary calibrator source standards (syringe and vial shapes) are illustrated in FIGS. 1-4 and described in further detail below.

Aspects of the exemplary embodiment also relate to a method for performing an accurate assay for calibration of the dose calibrator source standard under carefully controlled conditions in which a calibrator source standard and an equivalently shaped dose container containing a prescribed dose of the PET radionuclide (e.g., Fluorine-18 (F-18), Carbon 11 (C-11), Nitrogen 13 (N-13), Oxygen-15 (O-15), Iodine 124 (I-124), Rubidium 82 (Rb-82), Copper 64 (Cu-64), are calibrated against a common very-long lived radionuclide under the same conditions. While the calibration source standard may include an amount of one or more short lived radionuclides, e.g. as a result of the natural decay process, the prescribed dose of the PET radionuclide contains little if any longer lived radionuclides. For example, in the prescribed dose containing the PET radionuclide, long lived radionuclides (those having a half life in excess of 20 days) may contribute less than 1% of the activity of the prescribed dose.

Figure 1:
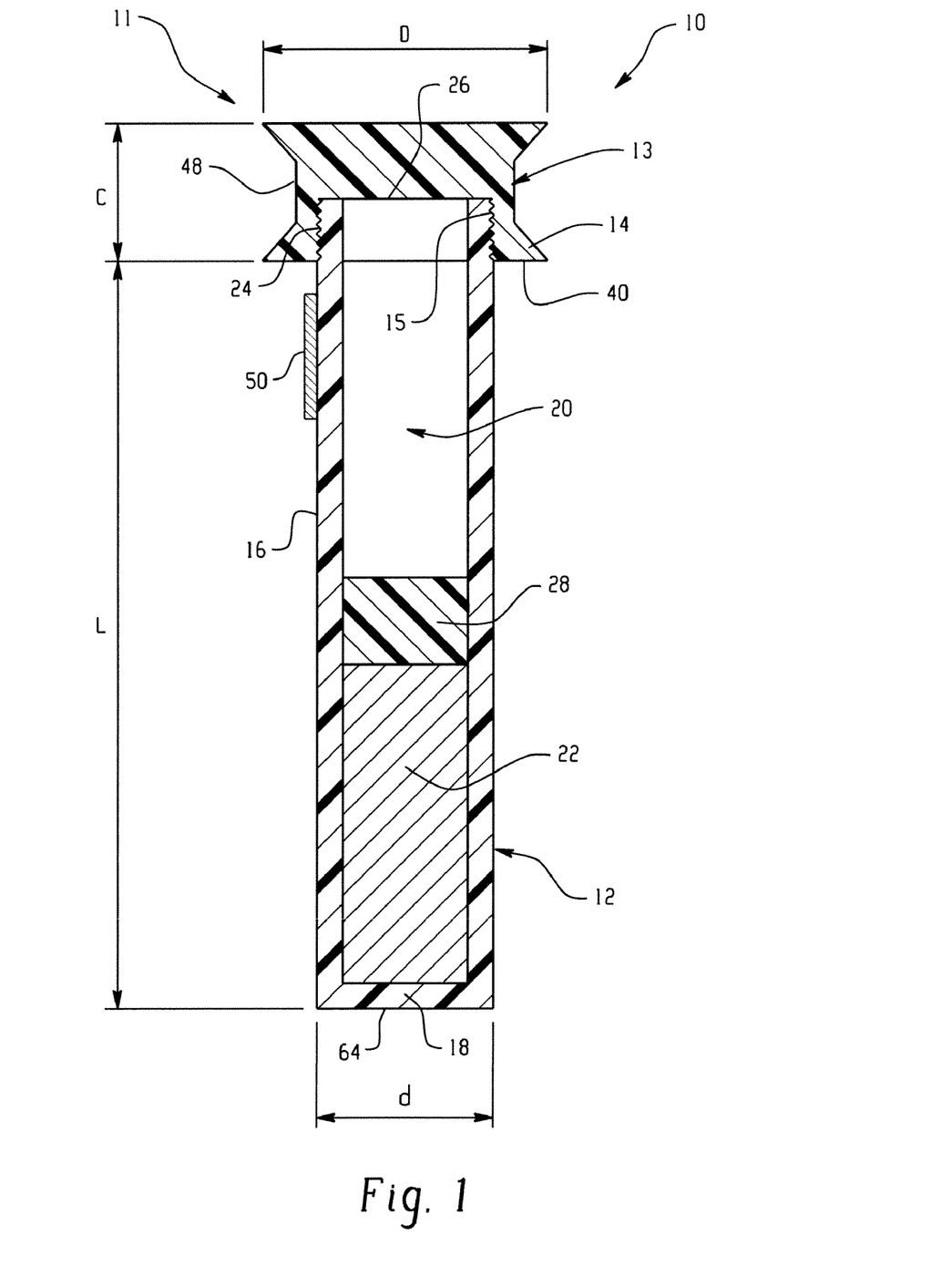
FIG. 1 is a side sectional view of a dose calibrator source standard capable of simulating a syringe or vial according to a first aspect of the exemplary embodiment.
Figure 2:
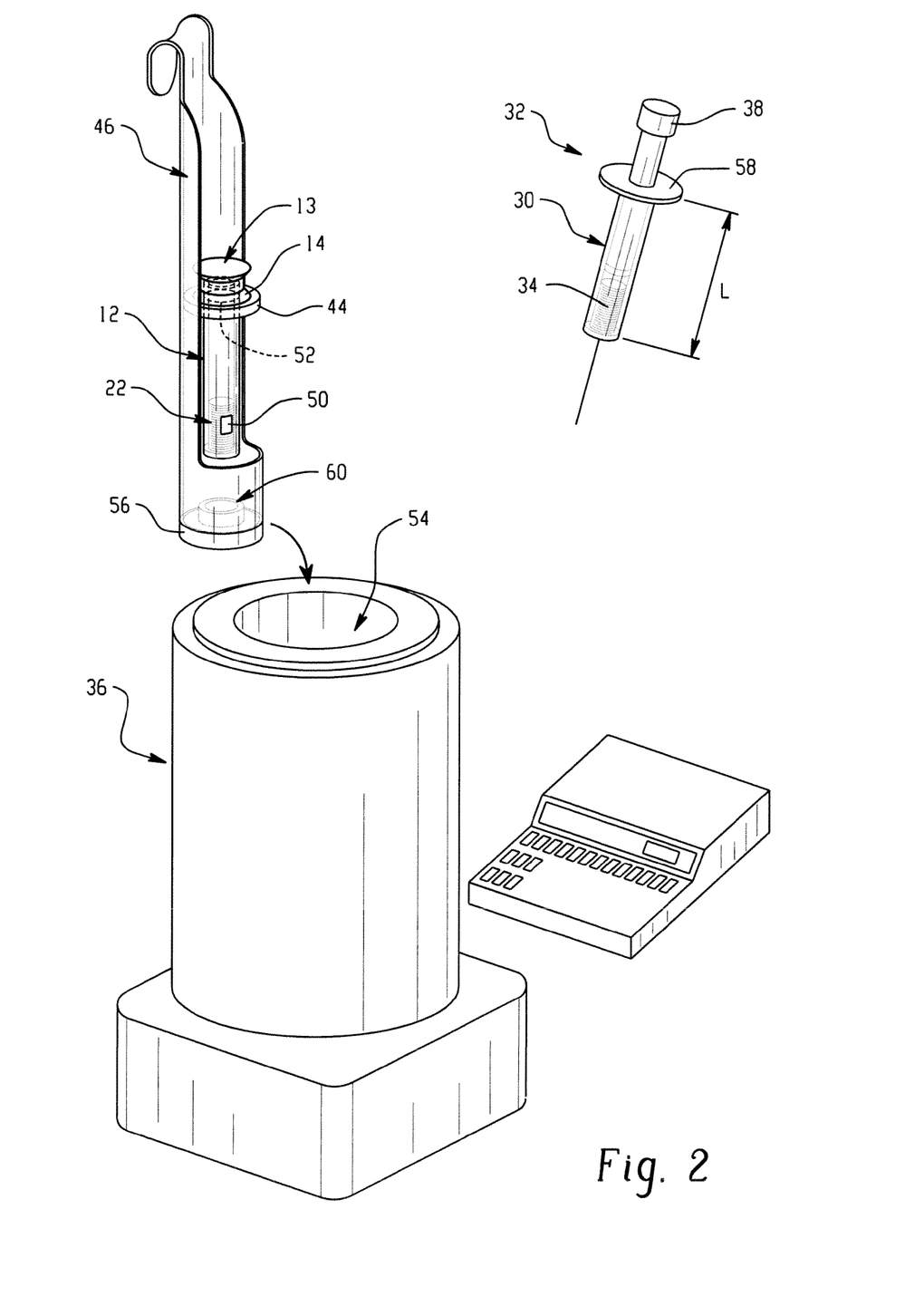
FIG. 2 is a perspective view of the dose calibrator source standard being lowered into a dose calibrator with a scoop and a syringe containing a radionuclide to be calibrated.
Figure 3:
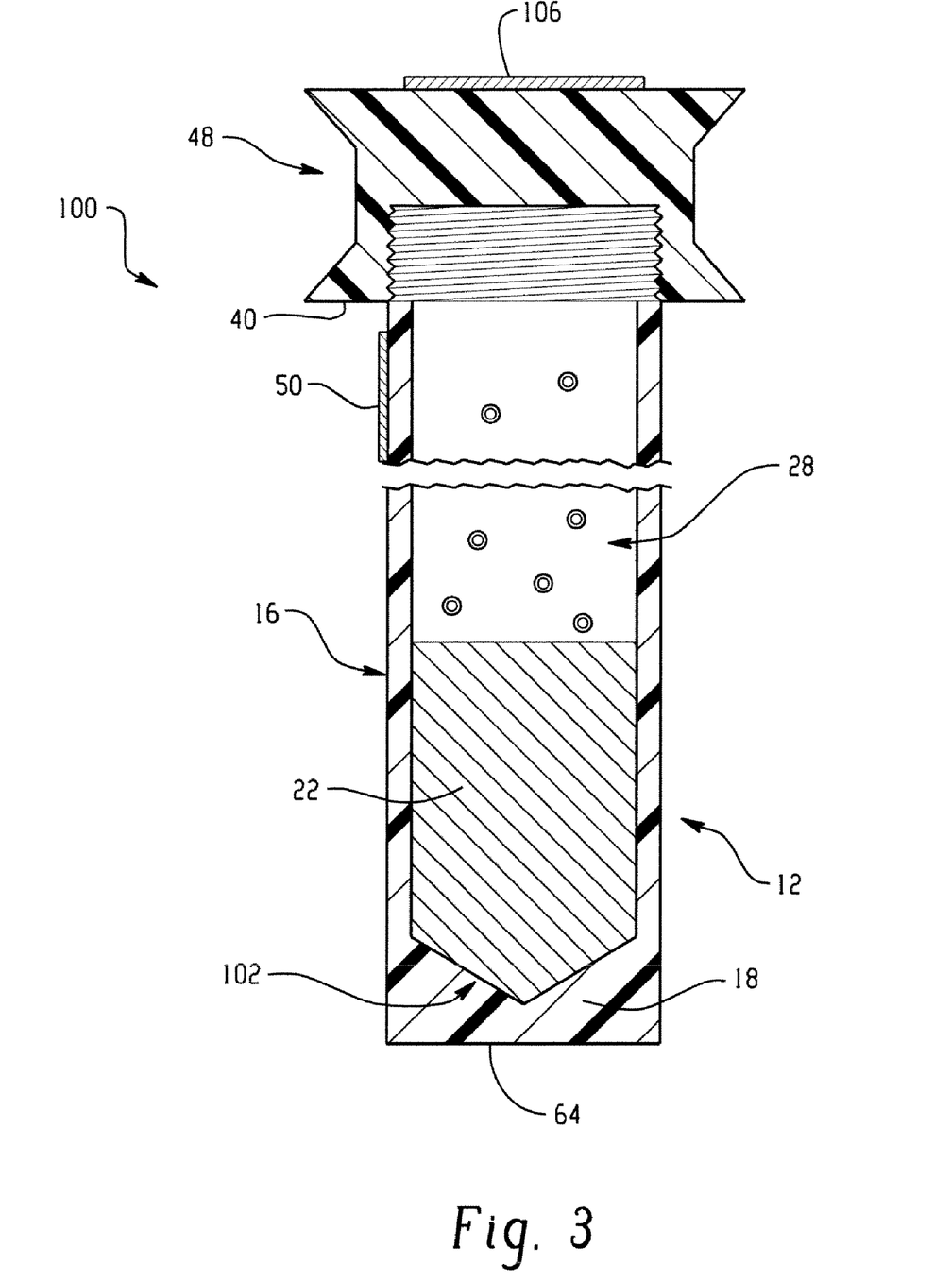
FIG. 3 illustrates another dose calibrator source standard capable of simulating a syringe or vial according to a second aspect of the exemplary embodiment.
Figure 5:
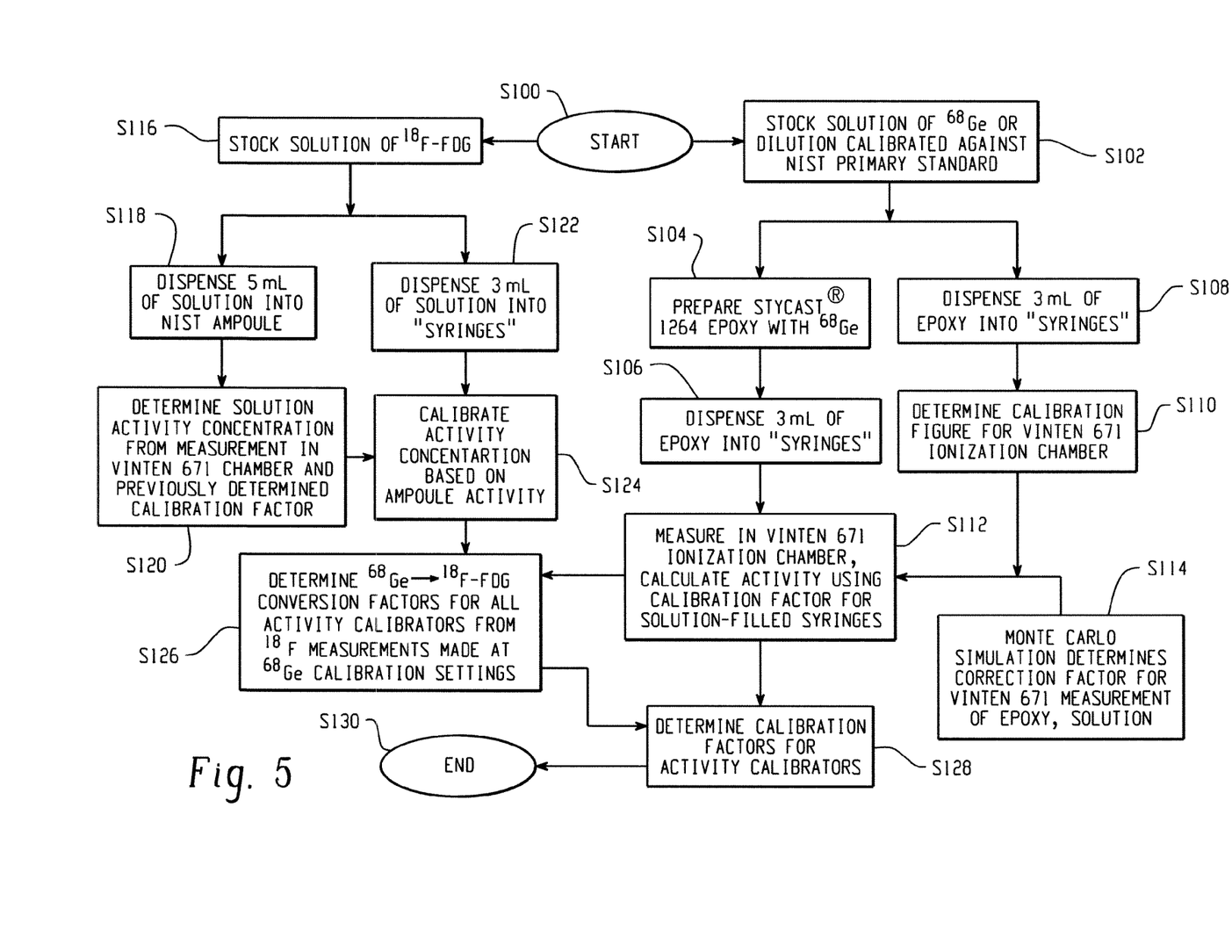
FIG. 5 illustrates a method of calibration.

FIG. 5 illustrates an exemplary calibration method using, as an example, Ge-68 as the master radionuclide and F-18 as the PET radionuclide and a syringe as the PET radionuclide unit dose container. The calibrator source standard is in the form of a mock syringe, designed to be similar in shape to the syringe used for the PET radionuclide, as illustrated in FIGS. 1-3. The method begins at S100.

At S102, a stock solution of Ge-68 (e.g. $GeCl_4$) is calibrated against a NIST primary reference standard. This step may be performed by filling an ampoule with the stock solution of Ge-68 (or a dilution thereof) which is flame sealed. The flame sealed ampoule is then calibrated against a very long lived (Radium-226) reference standard. This allows the concentration of the radionuclide in the stock solution to be accurately determined. This step may be omitted if the calibration against the reference standard is already known. For accurate measurements, a total of 1000 determinations of the background current are also performed at 2 second intervals and well as 10 determinations of the very long lived (Radium-226) reference standard. A representative number (e.g., 10) repeated determinations or ionization currents for the ampoule are taken at 2 second intervals.

The Ge-68 stock solution is used to prepare several calibrator source standards. In particular, at S104, the stock solution is combined with a matrix material (e.g., Stycast® 1264 epoxy, obtained from Emerson & Cuming, Billerica, Mass.). At S106, a known quantity (e.g., 3 mL) of the matrix material/stock solution mixture is dispensed into each mock syringe to be tested. For example, four or more mock syringes are prepared and the results obtained are subsequently averaged. Identically-shaped mock syringes are filled with an equivalent quantity of the stock solution (S108). The mock syringes filled with the stock solution are used to determine the effect of the syringe on the detection of Ge-68. This is achieved by calibrating the solution filled syringes against the reference standard (as described for the ampoule) and then comparing the results with the ampoules (S110). The same ionization chamber (e.g., a Vinten 671 calibration chamber) is used. At S112, the mock syringes filled with the cured epoxy/Ge-68 mixture are placed in the same ionization chamber and the activity of the mock syringes measured and calibrated using a calibration factor for the solution filled mock syringes. In the exemplary embodiment, a Monte Carlo simulation (S114) is performed to correct the measured activity for the effects of the epoxy vs. stock solution.

The same ionization chamber is also used for calibration of the selected PET radionuclide. At S116, a stock solution of the PET radionuclide (e.g., F-18 in the form of F-18 fluorodeoxy-glucose (FDG)) is prepared. A sample is dispensed into a flame sealed ampoule (S118) and calibrated against the reference Radium-226 radionuclide (S120), to determine the concentration of the PET radionuclide, as for the Ge-68. 3 mL of the stock solution is dispensed into a set of mock syringes (S122), and the activity concentration calibrated based on the ampoule activity (S124) as for S108 and S110.

To provide consistency, steps S118-S124 are performed at or about the same time as steps S106-S112 for the Ge-68.

At S126, a conversion factor is determined, based on the determined activities for the F-18 mock syringe and Ge-68/epoxy mock syringe, whereby the Ge-68/epoxy mock syringe can be used as a calibrator source standard for a conventional activity calibrator. Steps S114-S126, may be repeated for each PET radionuclide against which the calibrator source standard is to be calibrated.

The calibrated Ge-68/epoxy mock syringe(s) are then used to determine calibration factors for a standard activity calibrator. In particular, at S128, measurements are made on NIST-maintained commercially available ion chambers to determine an equivalent response on these pieces of equipment. The same procedure is then followed for each PET nuclide. Specifically, a single measurement is made at the prescribed settings for each target nuclide as well as 5 additional settings within a ±20 dial setting (±5 units on the AtomLab device) which will allow for the determination of a new calibration setting for each instrument tested. The method ends at S130.

New calibrator source standards of the same shape, e.g., syringes, can be prepared and their activity determined using the calibrated commercially available ion chamber. The same Ge-68 to F-18 conversion factor determined at S126 is used to find the equivalent PET nuclide activity for the calibrator source standard.

When a dose of the PET radionuclide, e.g., F-18 FDG fluoro-deoxy-glucose, is to be administered to a patient, its activity may be accurately determined by placing a syringe (now an actual syringe) containing the F-18 dose into an ion chamber which has been previously calibrated with a Ge-68 calibrator source standard. An exemplary apparatus comprising a syringe scoop for accurately positioning the syringe and calibrator source standard in the ion chamber is illustrated in FIG. 2.

As will be appreciated, the calibration method is specific to the size and type of dose container which is being used to hold the dose (or multiple doses). The calibration factor for Ge-68-F-18, determined for a mock syringe, for example, is only used when the dose is contained within a syringe or, in the present embodiment, within a vial of the same dimensions as the syringe (this can be achieved in the exemplary embodiment by forming a mock syringe which is capable of being positioned on a syringe scoop in two positions, a syringe position and a vial position (See FIG. 2). A different calibration factor is used when the dose container is a multi-dose vial of the type illustrated in FIG. 4. The multi-dose vial calibration factor is determined in the same way as for the syringe, but in this case, using a mock vial as the container for the calibrator source standard as well as for the liquid Ge-8 and liquid F-18.

The method is designed to provide a National Institute of Standards and Technology traceable standard where the radioactivity volume, physical geometry, and specific radionuclide assay is accurately reproducible.

Figure 4:
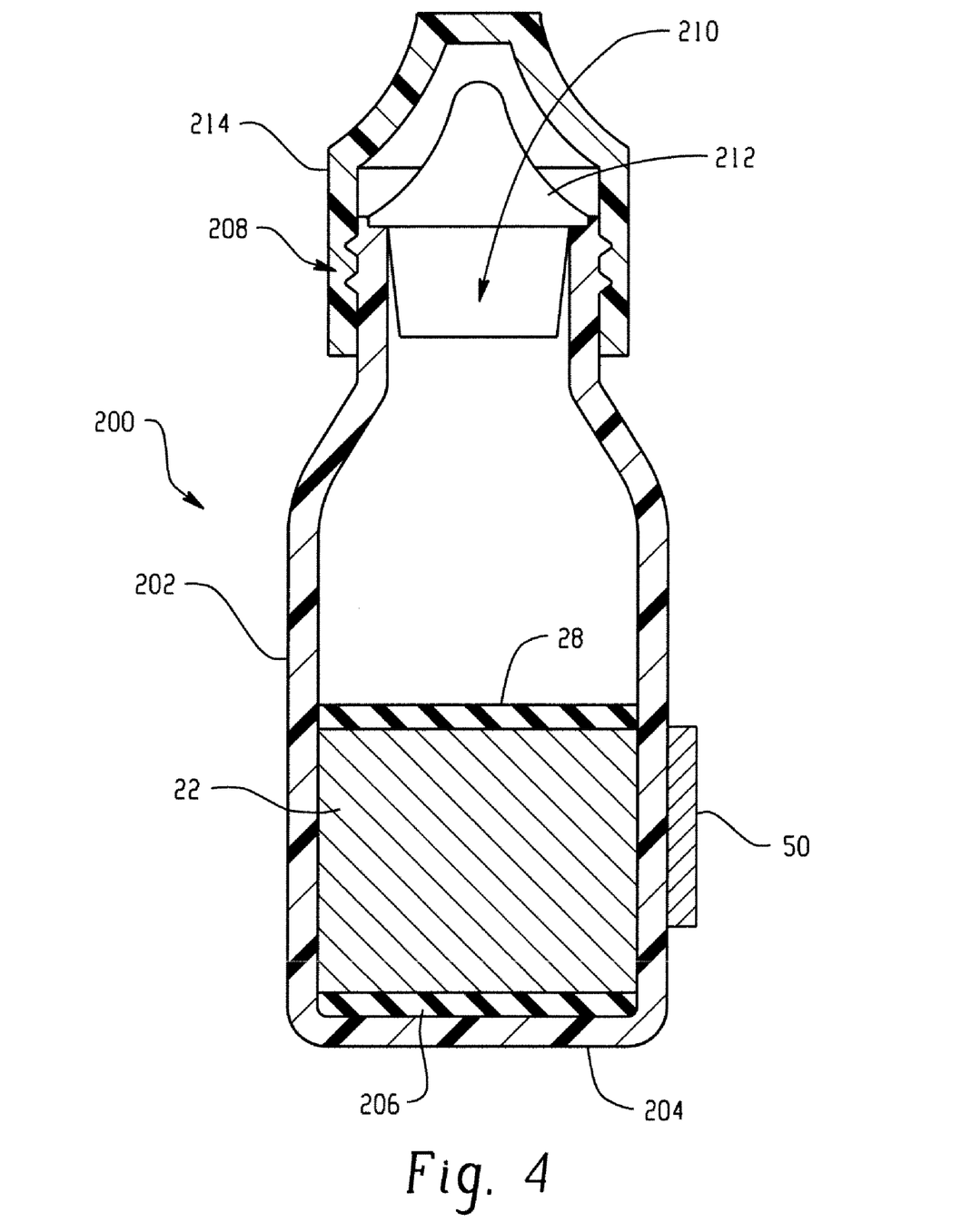
FIG. 4 is a side sectional view of a dose calibrator source standard according to a third aspect of the exemplary embodiment.

The designs of the calibrator source standards as shown in the attached figures encompass a syringe volume of approximately 3 cubic centimeters to approximately 10 cubic centimeters (FIG. 1) and a 10 cc multidose vial ("E" vial) commonly used for bulk PET radiopharmaceutical products (FIG. 4). In addition a vial geometry to provide calibration for PET generator elution assay is provided to allow for master batch activity determination of positron nuclide generators such as Ge-68/Ga-68 and Sr-82/Rb-82 prior to unit dosage preparation. The designs of these calibrator source standards meet or exceed the American National Standards Institute (ANSI) safety classification of 97C22312 as described in Publication ANSI/HPS N43.6-1997 "Sealed Radioactive Source—Classification."

The designs provide for encapsulation of the matrix with metal, plastic, or a combination of either for maximum safety to meet ANSI requirements.

By way of example, the following specifications may be required:

1. The radioactive source comprises a radionuclide dispersed uniformly in a high impact epoxy resin.
2. The product nominal activity is referenced to the label date. Nominal activity tolerance should be no more than +20% nor less than −10% at time of shipment.
3. Nuclide calibration shall be radioactivity content determined by an ionization chamber measurement with random errors computed at the 95% confidence level. Overall errors of calibration should be ±5% maximum. Measurement system standardization should be NIST traceable.
4. Radiopurity should meet radionuclide specifications at time of calibration.
5. Contamination/leakage testing of each source should be according to a specified procedure for contamination/leak testing of PET sources. Limit 5×10-3μ Curie.

Certificates and labeling to be provided per procedure.

ANSI N43.6-1997 performance classification of 97C22212 for calibration sources.

With reference to FIG. 1, a first embodiment dose calibrator source standard 10 according to the exemplary embodiment is illustrated. This calibrator source standard is designed to provide a National Institute of Science and Technology traceable standard where the radioactivity volume and physical geometry of the body of a syringe is reproduced, which may also serve as a vial standard. The source standard 10 includes a container 11 which includes a cylindrical encapsulation barrel 12 configured to mimic the barrel of a syringe and a closure member 13 mounted to the encapsulation barrel, which mimics the plunger of the syringe. The illustrated closure member 13 defines an enlarged diameter support member 14 in the form of a laterally extending annular flange and an interior socket 15. The encapsulation barrel 12 includes a cylindrical wall 16 of substantially uniform cross section which is closed at a lower end by a base 18. The base 18 may be integrally formed with the wall 16, for example by molding. The upper end of the barrel 12 is closed by the closure member 13 to define a sealed interior 20. A radioactive source-containing material 22 is sealed within the encapsulation barrel 12. The barrel 12 includes an exterior threaded portion 24 at an upper open end 26 which is configured for threadably engaging corresponding interior threads on the socket 15 of the closure member. A sealant material (not shown), may be applied to the threads to provide an airtight and tamper-resistant seal between the barrel 12 and the closure member 13. A void created between the radioactive source containing material 22 and the closure member 13 may be backfilled with an appropriate polymer matrix 28, such as epoxy, urethane, silicone, or other appropriate material. While FIG. 1 shows the interior having an air space above the matrix 28, it is contemplated that the entire interior space 20 above the radioactive material 22 may be backfilled with matrix 28, leaving no air space.

The encapsulation barrel 12 and closure member 13 may be formed from a plastic polymer, such as Lucite®, or a low Z material, such as aluminum or other material which is transmissive to substantially all radiation emitted from the source. The barrel 12 has an outer diameter d and length L (as measured from the base to support member) similar to that of a barrel 30 of a syringe 32 containing a radiopharmaceutical 34 (e.g., a PET radionuclide in solution) which is to be tested in a dose calibrator 36 of the type shown in FIGS. 2 and 3. In general the sidewall 16 has a length L which is at least twice a diameter d of the base 18. For example, the diameter d and length L may be within ±10% of the actual syringe dimensions, e.g., within ±5%, or identical thereto. The radioactive nuclide-containing material 22 thus occupies dimensions and a volume comparable to that of the radiopharmaceutical liquid 34 to be tested.

In one embodiment, the outer barrel diameter d may be up to about 2.5 cm (1 inch) and the barrel length L up to about 10 cm (4 inches). The volume of the interior 20 may be from about 3 to about 10 cm$^3$. The closure member 13 may have a height C and/or other dimensions which are similar to that of a plunger 38 of the syringe 32 for ease of handling although in general, the dimensions of the closure member are not critical. In operation, the illustrated support member 14 extends radially outwardly from the barrel wall 16 to define an annular surface 40 suitable for seating on a syringe shelf 44 of an ion chamber syringe scoop 46 of the type shown in FIG. 2. While in one embodiment, surface 40 is annular, it is also contemplated that the surface may be of any suitable configuration for resting on the shelf 44. For example, the surface 40 may be defined by two (or more) radially extending wings. The surface 40 may extend at least 0.3 cm from the barrel 12, e.g., at least about 0.5 cm and can be up to about 2 cm. The exact dimension may depend on the configuration of the scoop 46. The illustrated support member 14 includes an annular generally concave cavity 48, spaced from the support surface, for ease of transporting the dose standard 10.

While in the illustrated embodiment, the support member 14 is defined by the closure member 13, in alternate embodiments, the support member may be defined by the barrel 12, e.g., by being integrally formed therewith, for example as a lip.

The radioactive source-containing material 22 may include one or more radionuclides encapsulated in a suitable solid matrix material. Exemplary nuclides include gamma radiation emitters, such as germanium 68 (Ge-68) in appropriate quantities for serving as a standard for calibration. The matrix material may comprise an epoxy, silicone, urethane, ceramic, or similar type of matrix material in which the radionuclide may be uniformly dispersed.

To form the source standard 10, appropriate quantities of a radionuclide and a liquid polymer composition are mixed to disperse the radionuclide uniformly. The polymer composition may include a polymer resin together with accelerators, crosslinking agents, and the like which cause the polymer to harden when cured (e.g., by UV-curing or an ambient cure). The liquid radionuclide/polymer composition is placed in the barrel 16 and cured to form a solid 22. The barrel 16 may then be backfilled with polymer matrix material, which is also cured (the same procedure may be used during calibration, in S106). The barrel is then sealed to the closure member 13, for example, by placing a small amount of the polymer matrix material around the threads 24 and threadably connecting the closure member 13 to the barrel 12. The assembled source standard 10 is then calibrated e.g., against a traceable National Institute of Standards (NIST) solution. A custom decay calendar may then be derived and affixed by means of a label 50 to the source standard 10 or to a shielding container in which the source standard 10 is shipped and stored. The label 50 may also carry the conversion factor(s) for one or more PET radionuclides.

The source standard 10 can be used in two different calibration modes. To calibrate the dose calibrator 36 for use with syringes (first mode), the source standard 10 is supported on the syringe shelf 44 of a suitably configured syringe scoop 46. The scoop shelf 44 engages the support member surface 40. In particular, the scoop shelf 44 has a generally centrally positioned circular aperture 52 therein which is sized to accommodate the barrel 12 therethrough but which is smaller than the maximum diameter D of the support surface 40. The scoop 46 is then lowered into an ion chamber 54 of the dose calibrator 36 by a vertically extending handle 55. The shelf 44 of the scoop is vertically spaced along the handle from a base 56 of the scoop by a sufficient distance such that the syringe 30 can subsequently be accommodated by the scoop while being supported with a lip 58 of the syringe barrel resting on the shelf 44. The illustrated scoop base 56 includes an upwardly open vial cup 60 comprising a cylindrical wall 62 of suitable diameter to receive a conventional cylindrical vial source standard (not shown) therein. The exemplary base 18 of the source standard 10 is sized to fit within the vial cup 54 and has a planar lower surface 64 whereby the source standard 10 can rest on a correspondingly sized planar base surface 66 of the vial cup 60 with the source standard 10 in an upright position (second mode). In this way, the source standard 10 can be used for calibrating the dose calibrator 34 for syringes (when suspended on the shelf 44), or for vials (when seated in the cup 60), simulating, for example, a 10 cc multidosing vial. In both cases, the radiation source-containing material 22 is correctly positioned so as to be in a comparable location in the ion chamber 54 of the dose calibrator 34 to the actual dose of radiopharmaceutical 34 in the vial or syringe 32. The radiation emitted by the source standard 10 is detected by a radiation detector 68 and a measure of the radiation, such as the amount of radiation emitted per unit time, is recorded on suitable instrumentation 70.

The exemplary source standard 10 thus described meets or exceeds the American National Standards Institute (ANSI) safety classification of 97C22312 as described in Publication ANSI/HPS N43.6-1997 "Sealed Radioactive Source Classification."

FIG. 3 illustrates another embodiment of a source standard 100 which may be similarly configured to source standard 10, except as noted. In this embodiment, the base 18 has a conical interior surface 102 which is tapered to mimic the taper on the barrel of a syringe. As with the other embodiments a radioactive symbol 106 (radioactive trefoil) is applied, e.g., to the cap. Other embodiments are described in application Ser. No. 11/485,872, the disclosure of which is incorporated herein by reference.

In the embodiment of FIG. 4, a calibrator source standard 200 which simulates a multi-dose vial of a PET radioisotope is shown. The calibrator source standard 200 may be similarly configured to that of FIGS. 1 and 3, except as noted. In this embodiment, the vial has a side wall 202 which is closed by a base 204 at a bottom end. Side wall 202 and bottom end 204 may be integrally formed from polyethylene or other suitable material. The bottom end 204 may be covered with a cold epoxy barrier layer 206, which spaces the source matrix 22 from the bottom of the container. A similar cold epoxy barrier layer 28 may be applied on top of the source matrix.

The vial has a neck 208 at its upper end which defines an upper opening 210. The upper end is optionally closed first with a snap-in polyethylene support cone 212. To protect against leakage, an outer vial cap 214 is sealed to the container neck 208, overlying the support cone. The outer cap is sealed to the neck with a sealant, such as an epoxy. The container resembles closely the shape of a vial used to hold a multidose PET radionuclide material, but as for the embodiments of FIGS. 1 and 3, holds a gamma emitting source having a long half life, such as germanium 68, which is bound in a solid matrix material, in place of the positron emitting liquid. The volume of the vial 200 may be greater than 10 cm$^3$, e.g., about 20 cm$^3$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of calibrating a dose calibrator comprising:
   providing a first container which simulates the shape of a dose container for a first radionuclide, the first container containing the first radionuclide;

providing a second container which simulates the shape of the dose container, a radioactive source-containing material sealed within the container, the radioactive source-containing material comprising a second radionuclide dispersed within a matrix material, the second radionuclide having a half life which is greater than that of the first radionuclide; and determining a conversion factor for the first radionuclide as a function of the second radionuclide activity such that a calibrator source standard configured as for the second container is able to be used to accurately calibrate an activity calibrator for determining an activity of the dose container of the first radionuclide.

2. The method of claim 1, wherein the determining of the conversion factor includes measuring the activities of the first and second containers containing the first and second radionuclides in the same ion chamber.

3. The method of claim 1, wherein the second radionuclide has a half life which is at least 50 times that of the first radionuclide.

4. The method of claim 1, wherein the second container comprises:

a cylindrical barrel, which holds the radioactive source-containing material; and a support member which extends radially outward of the cylindrical barrel.

5. The method of claim 4, wherein the first container comprises a cylindrical barrel, which holds the first radionuclide, and a support member which extends radially outward of the cylindrical barrel.

6. The method of claim 1, wherein the second container is configured for calibrating a calibrator in two modes, a first mode, in which the second container is suspended from a support member of a scoop configured for receiving a syringe of the first radionuclide therethrough, and a second mode wherein a planar base of the second container is received in a cup of the scoop, spaced from the support member, the cup being configured for receiving a vial containing the first radionuclide.

7. The method of claim 1, further comprising labeling the second container with an activity of the second radionuclide and a conversion factor for the first radionuclide.

8. The method of claim 1, further comprising, calibrating the activity calibrator with the second container.

9. The method of claim 1, wherein the first radionuclide a positron emitter which is selected from the group consisting of Fluorine (F-18), Carbon 11 (C-11), Nitrogen 13 (N-13), Oxygen-15 (O-15), Iodine 124 (I-124), Rubidium 82 (Rb-82), Copper 64 (Cu-64), and combinations thereof.

10. The method of claim 1, wherein the second radionuclide comprises germanium 68.

11. A method of calibrating a dose calibrator comprising:

providing a dose calibrator source standard comprising a container comprising a cylindrical barrel and a support member which extends radially outward of the cylindrical barrel and a radioactive source-containing material sealed within the container which includes a second radionuclide for which a conversion factor for a first radionuclide has been determined according to the method of claim 1;

selecting one of a vial calibration mode and a syringe calibration mode;

when the vial calibration mode is selected, supporting the dose calibrator source standard in a cup of a scoop;

when the syringe calibration mode is selected, supporting the dose calibrator source standard by the support member on a shelf of the scoop, the shelf being spaced from the cup;

inserting the scoop and dose calibrator source standard into the dose calibrator;

recording a measure of the radiation emitted from the dose calibrator source standard; and converting the measure of radiation with the conversion factor to a measure of radiation for the first radionuclide.

12. A dose calibrator source standard comprising:

a container which simulates the shape of a dose container which contains a first radionuclide which is a positron emitter; and a radioactive source-containing material sealed within the container, the radioactive source-containing material comprising a second radionuclide dispersed within a matrix material and having a half life which is greater than the positron emitter; and the dose calibrator source standard having been calibrated to provide an conversion factor for the first radionuclide.

13. The dose calibrator source standard of claim 12, wherein the second radionuclide comprises germanium 68.

14. The dose calibrator source standard of claim 12, wherein the first radionuclide comprises at least one of the group consisting of Fluorine (F-18), Carbon 11 (C-11), Nitrogen 13 (N-13), Oxygen-15 (O-15), Iodine 124 (I-124), Rubidium 82 (Rb-82), Copper 64 (Cu-64), and combinations thereof.

15. The dose calibrator source standard of claim 12, wherein the container comprises a cylindrical barrel and a support member which extends radially outward of the cylindrical barrel.

16. The dose calibrator source standard of claim 15, wherein the container includes a closure member which is threadably mounted to the barrel.

17. The dose calibrator source standard of claim 15, wherein the support member is integrally formed with one of the barrel and a closure member which closes an open end of the barrel.

18. The dose calibrator source standard of claim 15, wherein the barrel includes a planar base configured for unaided support of the dose calibrator source standard in an upright position thereon.

19. The dose calibrator source standard of claim 15, wherein the support member and barrel in cooperation define a sealed interior chamber which houses the radioactive source-containing material.

20. The dose calibrator source standard of claim 15, wherein the support member is annular.

21. The dose calibrator source standard of claim 15, wherein the support member defines a surface configured for suspending the dose calibrator source standard on a shelf of an associated ion chamber syringe scoop.

22. The dose calibrator source standard of claim 15, wherein the barrel includes a base and a cylindrical wall extending from the base, the base having a lower surface which is generally perpendicular to the side wall for supporting the dose calibrator source standard in an upright position thereon.

23. The dose calibrator source standard of claim 22, wherein the base includes a conical inner surface which tapers outwardly away from the lower surface.

24. The dose calibrator source standard of claim 12, wherein the container has the shape of a vial and is sealed with a cap.

25. In combination, the dose calibrator source standard of claim 12 and ion chamber syringe scoop comprising:

a syringe shelf configured for supporting an associated syringe thereon, the syringe shelf configured for engaging the support member to suspend the dose calibrator source standard in the location of a syringe of a radiopharmaceutical comprising the first radionuclide to be calibrated; and a vial cup, spaced from the shelf, for receiving an associated vial containing a source of radiation and wherein the base of the dose calibrator source standard is sized for receipt within the vial cup to seat the dose calibrator source standard in the location of a vial of the radiopharmaceutical to be calibrated.

26. The combination of claim 25, wherein the barrel is of similar dimensions to a barrel of the associated syringe.

27. The combination of claim 25, wherein the syringe shelf supporting member defines an aperture which receives the barrel therethrough.

28. A system comprising the combination of claim 25 and a dose calibrator which receives the scoop therein.

* * * * *